United States Patent [19]

Lijewski et al.

[11] 4,245,244
[45] Jan. 13, 1981

[54] DEVICE FOR DELINEATING ZONES IN A VIDEO IMAGE DISPLAY

[75] Inventors: Robert R. Lijewski, Milwaukee; James E. Blake, New Berlin; Thomas W. Lambert, Dousman, all of Wis.

[73] Assignee: General Electric Company, Schenectady, N.Y.

[21] Appl. No.: 939,088

[22] Filed: Sep. 1, 1978

[51] Int. Cl.³ .............................................. H04N 5/32
[52] U.S. Cl. ............................... 358/111; 250/445 T; 358/183
[58] Field of Search .................... 364/414; 250/445 T; 358/111, 183; 340/709, 710

[56] References Cited

U.S. PATENT DOCUMENTS

| 3,780,223 | 12/1973 | Perry | 358/183 |
|---|---|---|---|
| 3,835,245 | 9/1974 | Pieters | 358/183 |
| 3,911,419 | 10/1975 | Bates et al. | 340/709 |
| 3,954,098 | 5/1976 | Dick et al. | 250/445 T |
| 3,987,685 | 10/1976 | Opocensky | 340/710 |
| 4,079,417 | 3/1978 | Scudder | 358/111 |

Primary Examiner—Robert L. Griffin
Assistant Examiner—Joseph A. Orsino, Jr.
Attorney, Agent, or Firm—Ralph G. Hohenfeldt

[57] ABSTRACT

Data derived from multiple x-ray views of a body layer is processed in accordance with an image reconstruction algorithm by a central processing unit (CPU) to result in a matrix of digital data corresponding with picture elements (pixels) which are for being displayed on a tv or video monitor. A device for delineating or identifying a region in the displayed picture with a box, irregular trace, or cursor with a bright dotted line uses a trackball to generate data signals corresponding in position with pixels in the matrix. The trackball generated data is processed for producing video picture modulating signals corresponding with the pixels in the matrix to which they positionally relate. The modulating signals are overlayed on the composite video signals from the display controller with a video mixer.

2 Claims, 1 Drawing Figure

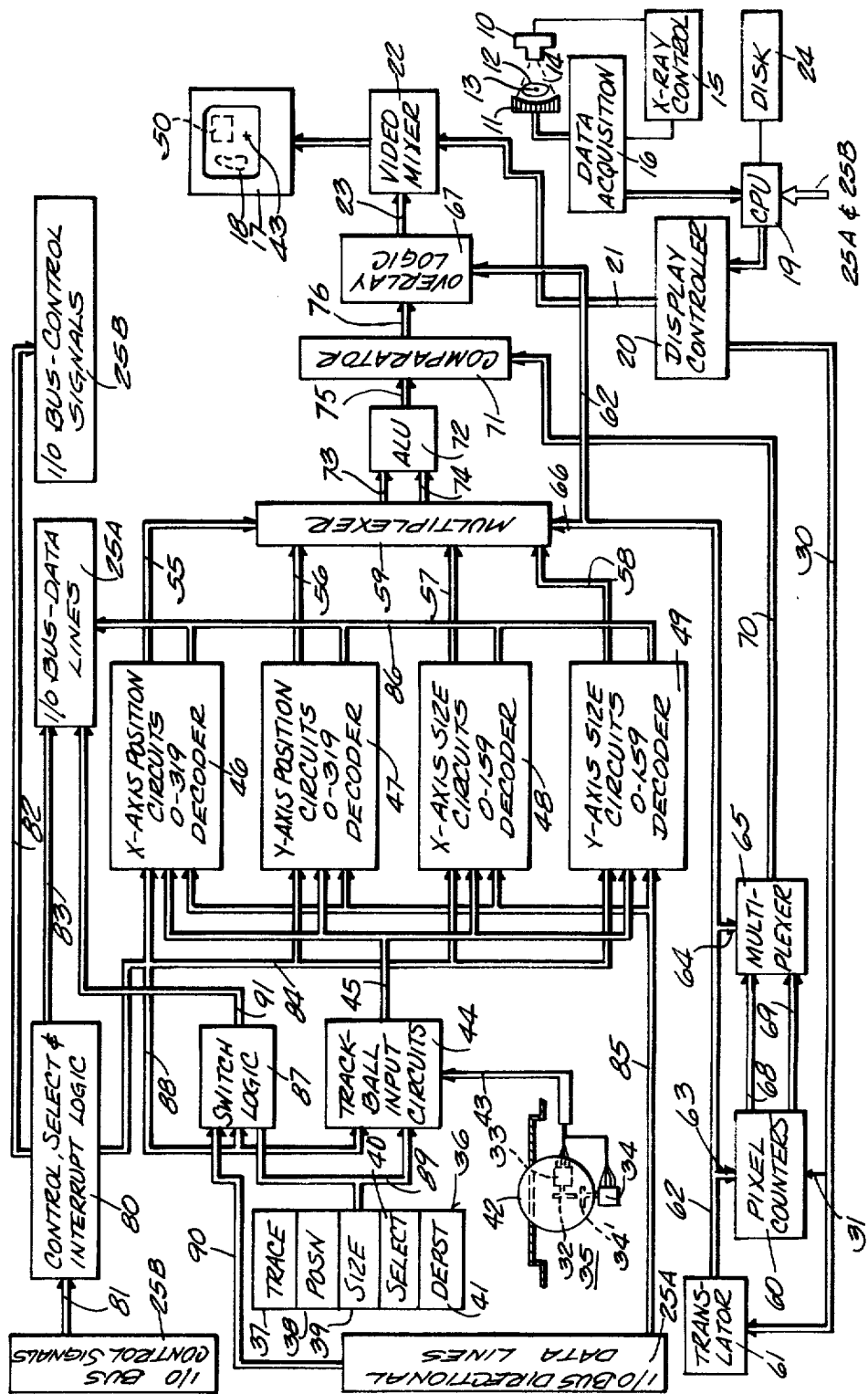

DEVICE FOR DELINEATING ZONES IN A VIDEO IMAGE DISPLAY

This invention pertains to a device for enabling delineating zones in an image that is being displayed on a video monitor screen. For example, the device can be used to write a bright cursor cross on the screen or an outline of a square or rectangle around a selected image zone or it can be used to write an irregular trace about a selected image zone. To exemplify how the device is constructed and used, it will be described herein as applied to a computerized tomography system.

In the computerized tomography (CT) method of making x-ray images of body layers, the examination subject or patient is supported coincident with a longitudinal axis. An x-ray source which projects a thin fan-shaped beam is on one side of the axis and array of x-ray detector elements are on the other side. The source and detector array orbit the body jointly. As the x-ray beam scans the body, each detector in the array produces an analog signal corresponding with x-ray absorption of all of the body elements intervening between the source and the detector element for one of the x-ray bundles which make up the fan-shaped beam. A set of analog signals is obtained at successive views or angular increments of orbital or rotational motion. After performing normalizing and other known electronic processing, these analog signals are converted to digital signals and subjected to computer processing. The computer executes an image reconstruction algorithm which, essentially results in a set of digital output signals that correspond in value with the x-ray absorption of each body element in the scanned layer.

The values of the digital output signals are called CT numbers and correspond with absorption coefficients for the respective volume elements in the layer. The digitized CT number signals, or at least their most significant bits, are sent to an image display controller where they are stored in a memory as a matrix of picture elements (pixels) which correspond with the matrix of body elements in that they have the same x and y coordinates. $256 \times 256$ and $320 \times 320$ are the most common matrix sizes but displayed images composed of 500 or more pixels in both directions are contemplated. The conventional display controller controls a video monitor which displays the reconstructed x-ray image on a cathode ray tube screen. Display controllers such as those made by Ramtek Corp., Grinnel Corp. and Lexidata Corp. are typical of those which are commercially available. The display controller stores the digital CT numbers or pixel information in an x-y format as is known. The controller also produces a clock signal for synchronizing readout of the matrix elements. The controller also produces the vertical and horizontal sync pulses for driving the display monitor synchronously in the raster scan mode and it also produces the requisite blanking pulses. The stored digital values representing pixels are, of course, converted to analog video signals for each scan line and these analog signals vary in magnitude in correspondence with the digital values of the CT numbers in that line of the matrix.

Usually, during a diagnostic examination, x-ray absorption data is taken for several successive layers of a patient's body. As soon as absorption data for a complete scan is obtained, it is processed in accordance with the computer reconstruction algorithm and converted to the above described form for use by the display controller. The data for images for several body layers is usually stored on magnetic disk or tape. The operator may access any of the images for display, such as for comparison purposes as an aid in image interpretation. The last image to be developed can usually be displayed within a matter of seconds after an x-ray scan is completed. A common goal of CT equipment manufacturers is to shorten the time between completing data acquisition and display of the image. Any computer interrupts occurring during image reconstruction delays reconstruction and display undesirably.

At least some present day CT machines have means for enabling the operator to write a straight line or to outline a box, cursor cross or an irregular trace on the video display screen to enable surrounding a zone in the displayed image which may be of particular interest. The selected outline or other form of writing on the screen is produced by modulating the cathode ray tube scanning beam to its brightest limit at appropriate times during a raster scan so the outline, whether it be a box, cursor cross or irregular trace, is essentially comprised of a number of bright dots which coincide with certain pixels in the matrix.

The most common method of writing on the image display cathode ray tube screen in the latest CT system designs is to use a "trackball." A trackball is the equivalent of an electronic joystick. As is well-known, a trackball comprises a smooth ball which is supported for revolving in all directions in a socket in a control console. A hemisphere of the ball is exposed so that the operator may rotate it by finger touch and watch the line or outline develop on the display screen. The concealed hemisphere of the ball rests on at least a pair or rollers which drive encoders. The encoders produce trains of electric pulses when the ball is turned. Rotation of the ball crosswise in one direction or the other results in the x encoder producing a train of pulses which are indicative of whether the ball is being turned in the $-x$ or $+x$ coordinate direction. Rotation of the ball toward and away from the operator produces corresponding $-y$ and $+y$ pulsed signals. Rotation of the ball on a line between the x and y axes, results in production of pulses which are the vector sum of the x and y signal components. If, after activating the writing system, the operator desires a bright trace to appear or change on the display screen, the operator will move the ball irregularly and the corresponding trace will form on the screen. Traditionally the operator had the options of forming small cursor crosses for measuring distances between selected points or portions of the image or forming an irregular trace or a box up to the full size of the screen for examining regions of interest.

Prior systems, and the system to be described, have been provided with the capability of selecting the zone encompassed by a box or trace, as represented in the display controller matrix, and expanding that zone on the full size of the screen. This affords magnification.

Conventional practice has been to effectuate generation of the trace, cursor or box using computer software with the same computer (CPU) that was used to execute the reconstruction algorithm. This meant that if it were desired to overlay or write an irregular trace, cursor, or box on the screen for a previously completed image which was being displayed, the CPU would have to accept interrupts which resulted from rotating the trackball. If the CPU were programmed to complete execution of the reconstruction algorithm using the latest data derived from a body layer before it could respond to the interrupts, there would be a time lag between the time the trackball was rolled and the time the overlay was visualized on the display screen. If the CPU were programmed to give priority to the interrupts, image reconstruction would be delayed. Unless the CPU just happened to be doing nothing else when the trackball was used, substantial delay would occur either to image reconstruction or to appearance of the box, cursor or trace on the screen.

It is the large number of interrupts required for writing on the screen that creates the problem in prior systems. Every point which is to be written corresponds with a pixel. A box, for instance, might be comprised of hundreds of points to make up its horizontal and vertical sides or its x and y dimensions, respectively. The rate of CPU interrupts would depend on the speed of ball rotation. Five hundred pulses per second, for example, would produce 500 interrupts per second, but this may be beyond the capability of the CPU for responding.

In the prior art systems, the points which form the outline of the box, trace, or cursor correspond with picture elements are stored in one of the memory planes of the display controller. For instance, the display controller memory matrix may consist of 320 11-bit digital numbers in each of the x and y directions so that 11 planes would be used for video data. The 12th plane would be used to store the data within a 320×320 matrix only a single bit deep. With the new device, which is to be described later, the points are only stored in this matrix and the CPU is interrupted only if the operator operates a "deposit" or "trace" function switch or if the CPU software requests the information.

SUMMARY OF THE INVENTION

An object of the present invention is to provide a device for writing on the display screen of a video monitor for a CT system or other system in which a monitor is controlled by a display controller, without, except under certain specific circumstances, requiring any interrupt of a CPU which might otherwise generate information for writing and perform other data processing functions as well.

Another object is to provide a system which allows writing on the display screen in real time.

A further object is to eliminate the substantial amount of CPU software which has heretofore been required to enable the operator of a video system that uses a display controller to overlay or write on a video display screen.

Yet another object is to employ a trackball or a rate type joystick or a positional type joystick or other suitable interactive device for determining both size and position of an irregular trace or box that is overlayed on the image on a video display screen.

Briefly stated, in accordance with the invention, a hardwired system for delineating or writing a cursor cross, box or trace as a bright dotted line on a screen is provided. In one illustrative embodiment the interactive device is a trackball which is operated in the usual manner to produce trains of pulses which are indicative of the directions in which the trackball is turned and which relate to the trace, cursor cross or box that is desired on the video display screen. When the system is initiated, the operator selects a point of interest on the displayed image and a cursor cross is formed at this point. The trackball, when rotated, will generate a train of pulses related to the desired direction of travel and size. When producing a box, the trackball performs the dual function of producing pulses corresponding with size and position of the box that is to be written on the screen. By using special controls, pulse trains are directed to size or position counters for indexing. The position counters generate the center coordinate of the box or cursor. The size counters generate the half-size measurements of the box. In one embodiment, the size and position counters have electronic limits to prevent the box or cursor from disappearing from view. An arithmetic logic unit (ALU) is used to compute the edges of the cursor or the outside dimensions of the box. The ALU is multiplexed to serve both the horizontal and vertical counter sets. At the same time, signals generated by the display counter or video data processor are supplied to provide synchronization and to generate a pixel grid using horizontal and vertical counter sets. This establishes a precise lock or synchronism between the display controller raster and the trackball subsystem at all times.

During each horizontal video scan line, a set of comparators compare each display controller pixel location with the box or cursor horizontal ALU calculation. When a compare is made the resulting output of the comparator changes state, thereby signalling the overlay electronics to generate a portion of the overlayed writing. During each horizontal flyback period, the comparison for the vertical axis is made with the same results as for the horizontal. Logic is provided for generating and summing each sgement of the overlay writing to form the composite box or cursor video overlay and to control the ALU to perform the proper calculations.

The resultant overlay information is sent out to a video mixer box. The video mixer box is an in-line component inserted between the display controller video output ports and the tv monitor or monitors or a CT camera. The box-cursor video overlay is simply analog summed with the display controller output video at this point and then sent on to the monitors. The result is a cross or box which appears to the operator to have been generated in the controller but in reality is being constructed in real time, over and over again, as an overlay for each tv field or frame.

The input-output (I/O) section of the trackball subsystem allows control of the trackball by the CPU. In the computer mode, size and position information can be parallel loaded into their respective counters, thereby moving or changing the cursor/box on command of the CPU. Also, information stored in the position and size counters can be read into the CPU on command of the CPU or by pressing a special function DEPOSIT (DEPST) key. The DEPOSIT function will also superimpose the selected cursor or box outline on the display screen into the overlay plane of the display controller to be stored for future viewing or for use by the CPU if the software dictates or until it is superseded by software or action of the operator. Standard I/O and interrupt logic may be used for this function.

Another special function key, TRACE, in conjunction with the trackball, will allow tracing of an irregularly shaped image into the CPU. Each coordinate change is fed to the CPU in a series of CPU interrupts and is deposited in a single dedicated plane in the display controller memory. A non-destructive more or less permanent outline of the desired image is formed similar to that which is formed when the DEPST function is activated.

Although the CPU is required to fully utilize the capabilities of this subsystem, all of the manual functions and the actual generation of the cursor/box overlay are done without use of the CPU.

A so-called trackball is not the only operator-to-system interactive device which is contemplated for inputting size and position information that results in a cursor, box or irregular trace being overlayed on the video display screen. Any input device may be used that responds to operator action by producing a train or trains of pulses which can be decoded into size, shape and position information. For example, commercially available positional or rate type electronic joysticks could be used.

The positional type of joy stick is similar to a trackball in that it will usually have x and y direction encoders but will also have mechanical stops. A train of pulses are produced as long as the joy stick is being moved. The stick stays in any position to which it is urged but pulses are no longer emitted. The pulses corresponding with the x and y direction movements pass over different lines to the decoding or processing circuits. The mechanical stops prevent the joystick from being moved so far that the cursor cross, box or trace or a part of them would run off of the display screen. Hence, there is no need to have the electronic limit setting means which are used in the trackball version of the joy stick scheme described herein.

The rate type of joy stick is characterized by causing a train of pulses to be produced wherein the pulse frequency is a function of the position of the joy stick. Small movement of the joystick causes low pulse frequency and greater movement causes higher pulse frequency. Instead of encoders, potentiometers may be driven with the joy stick for varying the time constant of an oscillator so the pulse frequency is proportional to the amount of joy stick movement. The joy stick is spring-returned to neutral position. Electronic size and position limit setting means are required to prevent the cursor, box or irregular trace from running off of the display screen.

Instead of using a special form of joystick such as a trackball with encoders or a joystick with potentiometers, encoders or a pair of potentiometers having manually accessible control knobs could be made available to the operator to effect pulse production.

One of the commercially available x-y tablets which scan a matrix with a "light pen" is another way of generating size and position data.

How the foregoing and other specific objects of the invention are achieved will be evident in the description of an illustrative embodiment of the invention which will now be set forth in reference to the drawing.

DESCRIPTION OF THE DRAWING

The drawing shows a diagram of the electronic components for the dedicated display screen writing or delineating system in conjunction with schematic representations of the principal components of a computerized tomography system.

DESCRIPTION OF A PREFERRED EMBODIMENT

Refer to the lower right area of the drawing where the elements of a body scanning computerized tomography (CT) system are shown schematically. In this example of how the new device is used, a CT system is the source of x-ray image data which is to be displayed as a visible image on a tv monitor. The body scanning apparatus comprises an x-ray source 10 and an array of x-ray detector elements 11. A body undergoing examination is marked 12. The body is disposed on an axis 13 which is perpendicular to the drawing. X-ray source 10 and detector array 11 are coupled together for jointly orbiting body 12 around axis 13. A diverging or fan-shaped x-ray beam, indicated by its dashed boundary lines 14, emanates from source 10 during a scan of a body layer. The source is pulsed on and off repeatedly in coincidence with uniform rotational increments of the source and detector. Every time the source is pulsed on, an analog signal is produced by each of the detectors in array 11. Thus each detector produces a signal representative of the total absorption by all small volume elements of the body which lay along rays which make up the fan-shaped x-ray beam 14. For every x-ray pulse, a view of the body is taken. A complete set of views result in production of all the data necessary to determine the x-ray absorption or attenuation of each of the body elements which are commonly called picture elements or pixels. The power supply and pulsing system for x-ray source 10 is symbolized by a single block marked 15.

The data acquisition system is represented by the single block 16. The electronics for data acquisition are well-known to those involved in the CT art and need not be described further. It is sufficient to mention that one of its functions is to convert the analog data to digital data.

The absorption data is sent to a central processing unit (CPU) 19. One of the functions of the CPU is to process the data in accordance with an image reconstruction algorithm. As is well-known, the ultimate result is a matrix of digital numbers which each represent the x-ray absorption or attenuation by the individual volume elements in the body layer which had been scanned. The values of the digital signals representing absorption by the body elements are customarily called CT numbers.

A video monitor, generally designated by the numeral 17, is used to produce a visual image of the body layer on its cathode ray tube screen 18. The video monitor is driven by a display controller 20 which may be one of several well-known types available from manufacturers mentioned earlier or others. As is well-known, display controllers of this type have a memory matrix which has several planes. For instance, there may be 12 planes which means that the memory can store a matrix of 12-bit digital numbers. In accordance with the invention, one plane is reserved for use in connection with the cursor, box or trace display so the stored CT numbers or pixel values are limited to 11 bits. The digital numbers are arranged in the matrix in correspondence with the body volume elements on which they are based.

Display controller 20 is a self-contained device which outputs composite video signals and produces horizontal sync drive pulses, vertical sync drive pulses, blanking pulses, the video signal and, in this case, pixel clock pulses. The display controller converts its stored digital values to an analog video signal for output. The signal pixel values in the matrix are read out in sequence by the row, and row after row at a rate which enables them to be displayed in the raster scan mode in video monitor 17.

In the new system, the analog output video signals from display controller 20 are fed by way of a cable 21 into a video mixer 22 before going to the video monitor. Another input to video mixer 22 is indicated by the line marked 23. The signals which are repeatedly overlayed on the regular video signals in real time to produce the cursor, box or trace on screen 18 are fed to the video mixer over line 23. How these signals are produced in accordance with the invention, will be explained shortly hereinafter.

When a scan of a body layer is complete and when the CPU 19 has executed the reconstruction algorithm, the data for display may be fed directly into the display controller 20 for that particular body layer image. The same data may be recorded on a magnetic medium as in the disk memory which is symbolized by the block marked 24. The operator is provided with means for transferring data from the disk memory 24 to the display controller 20 for any of the stored pictures. This is done under the control of computer software which has been devised by various persons who are skilled in that art so further explanation is not necessary.

All the input and output devices except the disk memory 24 and the new device in the drawing are assumed to be collectively represented by CPU block 19. The CPU is coupled with itself and with the outside world with a bidirectional bus which is indicated by the fragmentarily shown bus section 25A and 25B. This bus, of course, communicates with various components in the entire CT system as required.

Note, that for the purposes of the present invention, there is a cable 30 leading from display controller 20. This cable provides horizontal sync drive, vertical sync drive, and blanking pulses to the new part of the system to enable synchronizing and locating whatever box, cursor or trace is being written or overlayed on video monitor screen 18. The synchronizing and blanking signals provided over cable 30 are coincident with those that are delivered by way of cable 21 in connection with the composite video signal that drives monitor 17. The display controller also produces a clock pulse signal, called a pixel clock signal, corresponding in time with the time at which each pixel is read out of the matrix for image display. The pixel clock period is 1/320 of the horizontal line time if a 320×320 matrix is used in the display controller 20. The pixel clock signal is taken from one of the lines in cable 30 which is shown branching off of the cable and is marked 31.

The system for generating a cursor, box or trace, as desired, on video monitor screen 18 without, except in rare cases, interrupting the CPU, will now be described in greater detail.

In the illustrative embodiment, operator interaction with the screen writing or box, cursor and trace producing device is through a trackball module 35, including a trackball 42, and a set of function switches 36 which are both shown at the left region of the drawing. One function switch 37 is marked TRACE. The next one, 38, is for selecting position and is marked POSN. The next switch, 39, is marked SIZE. The next one, 40, is marked with a square and plus sign to indicate that it shoud be pressed when the operator desires to write a box or cursor. This will be called the SELECT push button switch. In the actual device, the SELECT push button has a square box and a cross inscribed on it. Pressing the switch consecutively switches back and forth between cursor selection and box selection. The last function push button switch 41, marked DEPST, is operated when the operator wants to store or deposit the data for generating a box, cursor or trace to make it available to the CPU and leave it "permanently" in the display controller 20. Operation of this switch is one of the rare occasions when the new box, cursor and trace writing system will result in the CPU 19 being required to service an interrupt. Another occasion is when a trace is being written as was the case in prior art trackball systems where, however, all box, cursor and trace functions were done through software.

The trackball type of joystick device 35 is operated when it is desired to write a bright dotted line trace, box or cursor on screen 18. The first thing the operator does is press SELECT push button 40. This results in a cursor cross such as the one marked 43 being generated on video monitor screen 18. By rotation of ball 42 of the trackball device 35, the operator can position cursor 43 wherever desired on the video screen 18 such as in a zone of the visual image which is of interest at the time. Rotation of trackball 42 in the x or y directions or combinations thereof, that is, along a resultant, will cause cursor 43 to move in corresponding directions on the screen. The primary use of the cursor in this hardwired device, and in prior art software controlled systems, is for making distance measurements on the display screen. The operator commands the cursor to appear and moves it to the desired location on the screen. DEPST is then pressed. The cursor is then moved to another location and DEPST is pressed again. The CPU responds to its program upon these events by drawing a dotted line between the two cursors using data in the 12th plane of the display controller memory. The CPU is also programmed to calculate and write the distance on the screen in centimeters. As will be explained, the trackball version of a joystick drives encoders which produce pulse trains that are processed as will be described and which determine the position of the cursor.

The point at which the vertical and horizontal lines, which form the cursor, intersect is designated as position A for convenience. The cursor disappears when a box is to be written or delineated and a light dot appears when a trace is to be written on the screen. The box is generated as an expansion in all directions from the center point A.

When the operator desires to generate a box such as the one marked 50 anywhere on the screen, SELECT button 40 is pressed to produce the box. POSN button 38 is automatically selected and lit by this interlock operation. This is followed by rotating the trackball to establish the correct location of the box. Then the operator presses the SIZE push button 39. Then when the trackball 42 is rotated in the x and y directions, the operator can watch the box develop on the display screen 18. When in the cursor mode, size is interlocked out since size has no meaning to a cursor. The half-size of the box is designated as the dimension, B. As indicated earlier, the center point of the box is designated as position A.

As indicated earlier, the trackball type of joystick device 35 responds to rotation of ball 42 by producing pulse trains. There is an axially thin roller 32 in contact with the surface of ball 42. The roller is on the end of a shaft which extends from an encoder 33. The plane of the roller is aligned with the y-axis so any rotation of the ball in the ±y direction will cause encoder 33 to produce pulses indicative of direction. There is also an x-axis encoder 34 which has an axially thin roller 34' that is frictionally driven by ball 42 and causes encoder 34 to produce pulses when the ball has an x-component of rotation. Each encoder in this example has 4 wires feeding an 8-bit output bus 43. If the ball has a +x component of rotation it feeds pulses out on one pair of bus lines and if it has a −x component it feeds out on another pair. The same is true for the +y and −y directions. This particular joystick assembly is not provided with any means for determining where directional movements started from.

Hereinafter, for the sake of simplifying terminology, the joystick device and all the variations of it which were mentioned earlier will be referred to as a trackball because that is what is used for illustrating a preferred embodiment of the invention. Simply having a stick, not shown, extending from the ball would make it look and perform like a conventional electric joystick.

The new hardwired trackball cursor, trace and box delineating system depends on counting pulses. After the pulses are processed in trackball input circuits which are collectively designated by the numeral 44, the pulses are transmitted over a 8-bit bus 45 to sets of up-down counters 46, 47, 48 and 49. The trackball input circuits 44 include line receivers and demultiplexers, not shown. The counters in sets 46–49 which are to be active must be selected, so demultiplexing is employed. Hence, size and position cannot be changed at the same time.

Rotation of trackball 42 loads the multiplexed signals from the trackball input circuits into the counters symbolized by blocks marked 46–49 where they are held in the register portions of the counters, not visible. The x axis position circuits including the up-down counters in block 46 store the number of counts from the edge of the screen to the center point A or position of the cursor. The y axis position circuits 47 store the number of counts along the y axis from the top of the screen. The x axis size circuits 48 store the number of counts representative of the half-size of the square or rectangular box which is to be written on video screen 18 such as the box marked 50. The y axis size circuits 49 count and store the number of counts that represent the half-size in the y direction. The box 50 actually grows on the screen out from the center point as the box is being written.

The x and y axis position circuits 46 and 47 are provided with 0–319 decoders and the x and y size circuits 48, 49 are provided with 0–159 decoders in this example. The decoders are used for setting the limits on the size and location of the box, trace or cursor on the screen 18. The limit of 319 for position and the limit of 159 for size is an incident of the fact that, in this example, the pixel matrix stored in the display controller 20 is a 320×320 matrix. When a joystick having its own limit setting stops is used in place of an infinitely rotatable ball 42, the electronic limits just discussed become unnecessary.

X axis position circuits 46 are outputted on a 9-bit bus 55. The 9-bit digital numbers on bus 55 represent the x coordinate of the box. Similarly, the y axis position circuits feed a 9-bit bus 56 on which the y position coordinates of the box center are represented by the 9-bit digital number. The x axis size circuits 48 output the value of the size in the x direction on an 8-bit bus 57. Similarly, the y axis size circuits output the size in the y direction on an 8-bit bus 58. Buses 55–58 feed into a multiplexer 59.

Data for generating a box, cursor or trace as produced by the x and y axis position and size circuits 46–49 must, of course, be coordinated with corresponding pixels in display controller 20 in order to have the box appear at the desired place on display screen 18. This is accomplished by taking some of the sync signals from the display controller 20 and reconstructing the matrix corresponding to the one on the screen in horizontal and vertical counters the same way they are being reconstructed in the display controller 20. As mentioned earlier, a cable 30 leads from display controller 20. It carries the video horizontal and vertical drive and blanking pulses and a pixel clock signal which is supplied, by way of cable 31 to a pixel counter 60. Each time the display controller 20 sends out a pixel as part of the video signal by way of cable 21 for producing a picture element on the screen, a pulse is delivered simultaneously over line 31 to the pixel counter 60. This synchronizes the counts stored in the x and y position and size circuits with the displayed pixels. The horizontal and vertical drive and blanking pulses from display controller 20 are delivered over four of the lines in cable 30 to a translator 61 where they are converted to TTL logic and then fed out to a video mixer cable 62 where they are fed into the pixel counter 60 by way of bus 63. They are also fed by way of a bus 64 to a multiplexer 65 and with a bus 66 to multiplexer 59. The signals are also fed to some overlay logic circuitry 67 at the end of video mixer cable 62 as diagrammed.

It will be evident from what has been discussed in the preceding paragraph that by using the same synchronizing drive pulses and blanking signals for the video image on screen 18 and for the overlayed cursor, box or trace, two time-related matrixes are developed.

Pixel counter 60 counts the number of pixels in each row of the matrix, beginning with each horizontal synchronizing drive pulse so there are a set of horizontal pixel counters, not visible, in the pixel counter circuitry 60. There are also a set of vertical or row counters. The outputs of these counters are connected to a pair of buses 68 and 69 which lead to multiplexer 65.

Bus 68 used, in this example, a 9-bit bus whose digital value at any time corresponds with pixels counted in the y or vertical direction and bus 69 is a 9-bit bus whose digital value at any time corresponds with the pixel location in the x or horizontal direction. This pair of 9-bit buses are the address lines leading to multiplexer 65. A 9-bit bus 70 runs from multiplexer 65 to a group of magnitude comparators which are collectively designated by the box identified as the comparator and further identified by reference numeral 71.

An arithmetic logic unit (ALU) 72 is used to compute the edges of the cursor or the outside dimensions of the box. The computations are as follows:

BOX:
$A - B - 1$ (left/top of box edges)
$A + B + 1$ (right/bottom box edges)

CURSOR:
$A - B - 1$ (left/top of blanking edges)
$A$ (hor. or vert. center of cursor)
$A + B + 1$ (right/bottom blanking edges)
$A =$ position; $B =$ half-size; $1 =$ pixel thickness; and, $B =$ fixed at 6 for cursor.

The ALU 72 comprises a number of commercial available integrated circuit elements which are not shown but well-known to those skilled in the art. Multiplexer 59 supplies the x and y axis position data to the ALU by way of 9-bit bus 73 and the x and y size data to ALU 72 by way of an 8-bit bus 74. At this juncture, we can consider that the trackball 35 has been operated to bring about storage of the x and y position and size coordinates in circuits 46–49 and that these parameters are stored in vertical and horizontal latches, not shown, in multiplexer 59. The horizontal or vertical position data is sent to ALU 72 by way of bus 73 and the horizontal or vertical size data by way of bus 74.

At the same time that the horizontal and vertical pixel counts from the pixel counter circuitry 60 are multiplexed into comparator 71, the x or y position and size data is multiplexed into ALU 72 from multiplexer 59. Multiplexing here means that the ALU has a choice of looking at the horizontal or vertical axis, but not both at the same time. Multiplexing is used to minimize electronics and lets either the horizontal or the vertical signals through in sequence. If multiplexing were not used, two sets of ALUs and two sets of comparators would be required.

The ALU looks at the x size and x position or y size and y position. If a box is being developed, the position coordinate A has been set by the trackball and the half-size in both the x and y directions has been set. The ALU performs the calculations indicated by the equation set forth previously. For instance, if $A-B-1$ is calculated by the ALU, for the x direction, the point or pixel element at that distance below the center point or points A is determined. If it calculates $A+B+1$, it determines the other limit of the box in the x direction. Similar calculations are made in the y direction based on the center position A and size B.

Now suppose that there is a sweep down a horizontal line. One starts at the left end of screen 18. Multiplexer 59 is switched to the x axis. $A-B-1$ for the x axis is calculated by ALU 72 and is fed into comparator set 71 by way of bus 75. At the same time, the pixel counter 60 and multiplexer 65 is switched into the x mode. This enters the data into the other set of inputs of the comparator by way of bus 70. To continue the example, as scanning proceeds, a point is reached where pixel $A-B-1$ is compared or found equal to a counted stored pixel which represents a point on the box that is being produced. When a comparison occurs, the output line 76 of comparator 71 changes state. This forms a pulse which will be a piece of the overlay.

As the scan continues, the comparator will see a second calculation $A+B+1$. Another pulse will be generated by the comparator which will represent the right side of the box. When one horizontal line is scanned, horizontal retrace occurs and scanning of the next row or line will then proceed and the foregoing process repeats.

Another reason for multiplexing might now be evident. During the entire active line scan, x computations are being done on the fly, from beginning to end of the line. The multiplexers are locked into the x mode and both pixel data and the ALU output data are coming into the comparators. During the horizontal flyback timing interval, the multiplexers switch to the vertical mode. Comparison for the vertical or y axis then occurs. In other words, during the retrace, which may be 10 microseconds out of 60 microseconds, the ALU switches over and services the vertical axis in the same manner as it does for the horizontal axis. It will then be sweeping down from top of the screen to the bottom and will see a compare and generate an entire horizontal line comprised of dots which correspond with all the pixels in the row of the display controller matrix and the simulated matrix in which the horizontal line is stored. That data is stored and then during the next active line it goes back and services the horizontal again. The multiplexers are operated by the blanking pulses, which in effect, is the horizontal flyback time.

To illustrate the above process in another way, consider that each pixel occurs in about 100 nanoseconds. There must be time to let the system service the horizontal all the time because it must look at the line pixel-by-pixel. Hence, it has to stay running to see if there are comparisons anywhere along the horizontal line. The horizontal is not running during vertical retrace so it can go back and look at vertical. During each horizontal flyback, it is looking for a compare with the y axis position and size data and seeing if there is a compare in that direction. Once it makes a compare, instead of generating a dot, it will generate an entire line. Actually, comparisons are being made from top to the bottom of the matrix even though the box may be in the middle or elsewhere. Similarly, during the line-by-line vertical scan comparisons are looked for on both vertical lines or box ends from the top to the bottom of the screen or matrix. The overlay logic is used to blank out everything outside of the box.

In any event, every time a comparison is made, and as a result of further functioning of the overlay logic 67, there is a change of state on output line 23 from the overlay logic. As mentioned earlier, these changes of state constitute signals which are introduced to the video mixer 22 to cause the writing beam of the cathode ray tube display to be modulated to maximum brightness so as to produce light dots which make the box appear most conspicuous on screen 18.

Producing the cursor is similar to producing a box, but with the cursor, there is only one vertical and one horizontal line. For the cursor, a box is actually generated which determines the bounds of the cursor and everything but the cursor is blanked out.

The overlay logic consists of combinational logic and flip-flops which are not shown. The overlay logic takes the signals from the comparators 71 and the signals from the display controller 20 and uses them to determine what should be erased from the detected lines to result in defining a box or a cursor. Consider the x position of the box. At the beginning of each horizontal trace, a flip-flop, not shown, in the overlay circuit is set to a given state which results in the overlay being blank. When the first compare pulse comes along, it toggles this flip-flop to an opposite state. This causes the signal to go from the blanked to the unblanked state at $A-B-1$. The flip-flop will stay in this state, that is, in the overlay unblanked state, until $A+B+1$ comes along. It then flips or toggles again and the overlay goes blank again. Hence, there is blanking out from the left side of the screen to the first dot and from the end of the second dot to the right side of the screen. Another flip-flop does the same thing for the horizontal line that is written during the vertical scan.

There are also circuits, not shown, in the overlay logic block 67 which account for a situation where the box or a part of it would go off the screen. Assume, for example, that the upper left corner of the box were off the screen. When scanning to the left edge and upper edge of the box which are off the screen, one would have to depend on the pulses from the display controller to reset everything. Suppose the ALU is set in $A-B-1$ and trys to get a compare while $A-B-1$ is, in fact, off the screen. Because of this condition, the compare would never occur, causing subsequent logic not to occur. The circuitry in the overlay logic will sense this and set the flip-flop to $A+B+1$ immediately in anticipation of the fact that A−B−1 is off the screen. In reality, a signal is taken off of the ALU which will enable detecting underflow. Underflow is detected and a signal is fed into the overlay circuit and causes the ALU to be set in a different mode than it normally would be. This is done for both axes as the need dictates.

The CPU interrupt and interfacing structure used in the system is based on the widely adopted Data General Corporation structure as set forth in Data General Manual Nos. 015,000031-00, Revision 0 described as "Users Manual, Interface Designers Reference" and 014-000058-00, Revision 0, described as "NOVA 3 Reference Manual."

Box 80 in the upper left corner of the drawing labeled control, select and interrupt logic symbolizes Data General standard interface structure. It has an input bus 81 which will handle 21 control bits from CPU 19. Bus 81 couples to bus 25B which leads to 25B next to CPU 19. Box 80 has a bus 82 leading from it which is part of the standard Data General structure. It couples with I/O bus-control signals, 25B, which goes to CPU 19. Another standard structure bus 83 out of box 80 is for handling 6 interrupt address-back bits in the CPU 19 as symbolized by this bus being coupled to I/O bus-data lines 25A.

In accordance with standard practice, any time the CPU 19 sends data, command or control signals to a device, the CPU can ask for the signals to be addressed back to it from the receiving device to enable the CPU to check if the signals were received accurately. As an example, if the system software dictates that the x and y position data and the x and y size data generated by the CPU take priority over size and position data which has been inserted in x axis and y axis position circuits 46 and 47 and x axis and y axis size circuits by using trackball device 35, control circuit 80 logic will enable the x and y position and size circuits 46–49 to receive the data by providing command signals over bus 84 which leads to each of these circuits 46–49. On command, the x and y position and size data will be fed from the CPU by way of bus 25A and a 16-bit data bus 85 to circuits 46–49. Thus, a cursor, box, or trace generated by the CPU will appear on video screen 18. At an appropriate time the command is given and the same data will be read back to the CUP for accuracy check by way of a bus 86 which couples output signals from size and position circuits 46–49 to I/O bus 25A for input to the CPU.

Switch logic is symbolized by the block 87. Switching signals are fed as output from the CPU through control block 80 and a bus 88 which is shown as a branch off of 18-bit command signal bus 84.

The manual function select switch 37–41 in group 36 couple to trackball input circuits 44 and switch logic 87 by way of an 8-bit bus 89. Actuation of the function switches causes their indicator lamps to go on as controlled by switch logic 87. There is also a 4-bit bus 90 for data bits out from bus 25A and the CPU and in to switch logic 87. The data on bus 90 is for allowing the CPU to perform manual commands. Bus 91 from switch logic 87 is for reading these command signals back to the CPU by way of bus 25A so the CPU can check if the switch logic or a device which it controls has received the commands accurately.

To summarize, in the new system the trackball can be turned to select both box size and cursor position as opposed to prior practice of having separate controls for size and cursor. When a box or cursor is to be delineated on the display screen by manual control of the trackball, the CPU need not be interrupted. CPU interrupts are limited to situations where an irregular trace is to be delineated on the display screen, where CPU software causes parameters which the CPU produces for generating a cursor, box or trace to be sent to the size and position counters and, where size and position data which has been produced with the trackball is transferred to the CPU for its use. The new hardwired trackball system permits all functions which could be obtained with the prior art exclusively software controlled systems and, especially in CT apparatus, enables faster image reconstruction and display.

We claim:

1. A computerized tomography system comprising:
means for producing data representative of x-ray images resulting from absorption of an x-ray beam projected in a plurality of directions through a layer of a body,
a CPU operative to control said signal and to process said data in accordance with an image reconstruction algorithm resulting in a matrix of digital signals corresponding with picture elements (pixels) composing said layer as viewed perpendicular to the layer,
a video monitor having a display screen,
video display controller means for controlling said monitor and having memory means for storing said digital pixel signals in a matrix wherein the rows of said matrix correspond with horizontal scan lines on said screen as said monitor is operated in the raster scan mode, said controller being adapted to scan and read out said matrix of digital pixel signals, to convert them to analog video signals and to generate composite video signals for driving said monitor,
a pixel clock pulse generator for producing pulses in synchronism with the readout of said pixel signals,
a device for delineating a selected one of a box, a cursor, or a trace on said display screen while said picture is being displayed and independently of said CPU, said device comprising:
joystick means movable manually in the x and y directions and in resultant directions and means responsive to said movements by producing a train of pulses representative of the position of a box, cursor or trace which is to be delineated on said display screen and trains of pulses which are respectively representative of the size of said box in the x and y directions,
x-axis and y-axis position circuits including up-down counter means for counting the pulses representative of the x and y coordinates of the position of said box, cursor or trace and including register means for storing data representative of said position,
x-axis and y-axis size circuits including up-down counter means for counting the pulses representative of the x and y direction sizes of said box and including register means for storing data representative of said sizes,
an ALU having input means for said size and position data and having output means, said ALU being operative to calculate the coordinates of said size data relative to said position data and relative to corresponding locations in said matrix,
multiplexer means for coupling said position or size representative data to said ALU input means, a comparator having input and output means, said input means being coupled to the output means of said ALU, said pixel clock pulses controlling said comparator to produce an output signal whenever there is coincidence between the coordinates of any of said position or size representative data and the pixel in said matrix with which said data corresponds, and a video mixer operative to superimpose said output signals on said composite video signal to thereby overlay a bright spot on said screen coincident with each output signal.

2. The device as in claim 1 wherein said joystick means comprises a fully rotatable ball, said means which are responsive to movements of said ball by producing trains of pulses comprising a pair of encoders, one of said encoders producing pulses in response to said ball undergoing an x-direction component of movement and the other of said encoders producing pulses in response to said ball undergoing a y-direction component of movement.

* * * * *